(12) United States Patent
Chan et al.

(10) Patent No.: US 11,570,489 B2
(45) Date of Patent: Jan. 31, 2023

(54) HIGH DEFINITION MULTIMEDIA INTERFACE TRANSMISSION DEVICE AND CONTROL METHOD THEREOF

(71) Applicant: Realtek Semiconductor Corp., HsinChu (TW)

(72) Inventors: Chun-Chieh Chan, HsinChu (TW); Tai-Jung Wu, HsinChu (TW); Chia-Hao Chang, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 98 days.

(21) Appl. No.: 17/186,009

(22) Filed: Feb. 26, 2021

(65) Prior Publication Data

US 2022/0150555 A1 May 12, 2022

(30) Foreign Application Priority Data

Nov. 9, 2020 (TW) ................................. 109139006

(51) Int. Cl.
H04N 21/2343 (2011.01)
H04N 21/4363 (2011.01)

(52) U.S. Cl.
CPC ... H04N 21/2343 (2013.01); H04N 21/43635 (2013.01)

(58) Field of Classification Search
CPC ......... H04N 21/2343; H04N 21/43635; H04N 21/44227
See application file for complete search history.

(56) References Cited

U.S. PATENT DOCUMENTS

| 8,958,475 B2 | 2/2015 | Raveendran | |
|---|---|---|---|
| 2001/0013123 A1* | 8/2001 | Freeman | H04N 21/4347 348/E7.071 |
| 2020/0029121 A1* | 1/2020 | Zhang | G06F 5/14 |

FOREIGN PATENT DOCUMENTS

| CN | 102474364 A | 5/2012 |
|---|---|---|
| CN | 108668144 A | 10/2018 |

* cited by examiner

*Primary Examiner* — Farley Abad
(74) *Attorney, Agent, or Firm* — Winston Hsu (57) ABSTRACT

An HDMI transmission device includes a packetizer circuit and a processor. A control method of controlling the HDMI transmission device includes performing a fixed rate link training, upon passing the fixed data rate link training, the processor transmitting an initial gap packet generation command to a controller of the packetizer circuit to output a selection signal to the packetizer circuit, so as to output an initial gap packet, when video data is not ready, continuously outputting the initial gap packet, when the video data is ready and a format change of the video data is detected or a signal abnormality unrelated to hot-plugging is detected, the processor transmitting a subsequent gap packet generation command to the controller to determine whether a block boundary is reached, and the controller switching the selection signal upon reaching the block boundary for the packetizer circuit to output the subsequent gap packet.

14 Claims, 8 Drawing Sheets

HIGH DEFINITION MULTIMEDIA INTERFACE TRANSMISSION DEVICE AND CONTROL METHOD THEREOF

CROSS REFERENCE TO RELATED APPLICATION

This non-provisional application claims priority of Taiwan patent application No. 109139006, filed on 9 Nov. 2020, included herein by reference in its entirety.

BACKGROUND OF THE INVENTION

1. Field of the Invention

The invention relates to an imaging system, in particular to a high definition multimedia interface transmission device and a control method thereof.

2. Description of the Prior Art

A high definition multimedia interface (HDMI) is a full digital interface device for transmitting video via an HDMI cable. In order to satisfy the demand for high-quality digital images, HDMI 2.1 defines a new fixed rate link (FRL) transmission mode to increase the transmission bandwidth to 12 Gbps. The high-speed transmission bandwidth allows HDMI 2.1 to be widely used in consumer electronic products.

In FRL transmission mode, it is required to perform FRL training to determine the data transmission rate prior to establishing an FRL connection, so as to ensure the accuracy of data transmission/receiving, and to ensure the maximum transmission bandwidth of the transmission channel. However, in a normal HDMI transmission scenario, the video format may change at any time, and the video transmission may resume after an interruption. For example, during a scene change upon a game console starting or leaving a game, or during a boot of a computer loading a BIOS (basic input output system) to enter an operating system, videos will be switched from a low-resolution to high-resolution setting, or an image format change will occur to switch from displaying a desktop screen or to playing a video, and consequently, FRL training will be performed to take account of the resolution or format changes. The FRL training is time-consuming, and new images will only be displayed after the FRL training is completed, resulting in an unfavorable user experience.

SUMMARY OF THE INVENTION

According to an embodiment of the invention, a high definition multimedia interface (HDMI) transmission device includes a packetizer circuit, a non-volatile memory and a processor. The packetizer circuit includes a gap packet generator, a video packet generator, a multiplexer and a controller. The gap packet generator is configured to generate an initial gap packet and a subsequent gap packet. The video packet generator is configured to generate a video packet according to video data. The multiplexer includes a first input terminal coupled to the gap packet generator, a second input terminal coupled to the video packet generator, a selection terminal configured to receive a selection signal, and an output terminal configured to output the data from one of the first input terminal and the second input terminal according to the selection signal. The controller is coupled to the multiplexer, and is configured to output the selection signal to output the initial gap packet upon receiving an initial gap packet generation command, and determine whether a first block boundary is reached upon receiving a subsequent gap packet generation command, and switch the selection signal upon reaching the first block boundary, so as to switch from outputting the video packet to outputting the subsequent gap packet. The non-volatile memory is used to store executable code. The processor is coupled to the controller and the non-volatile memory, and is configured to execute the executable code to perform a fixed rate link (FRL) training process, transmit the initial gap packet generation command to the controller upon passing the fixed data rate link training process, continue to output the initial gap packet when the video data is not ready, and transmit the subsequent gap packet generation command to the controller when the video data is ready and a format change of the video data is detected and/or a signal abnormality unrelated to a hot-plugging mechanism is detected.

According to an embodiment of the invention, a method of controlling an HDMI transmission device including a packetizer circuit and a processor comprising perform a fixed data rate link training process; upon passing the fixed data rate link training process, the processor transmitting an initial gap packet generation command to a controller of the packetizer circuit; upon receiving the initial gap packet generation command, the controller outputting a selection signal to the packetizer circuit for the packetizer circuit to output initial gap packet, when it is determined that the video data is not ready, continuously outputting the initial gap packet, when the video data is ready and a format change of the video data is detected or a signal abnormality unrelated to a hot-plugging mechanism is detected, the processor transmitting a subsequent gap packet generation command to the controller, and upon receiving the subsequent gap packet generation command, the controller determining whether a first block boundary is reached, and switching the selection signal upon reaching the first block boundary, for the packetizer circuit to switch from outputting the video packet to outputting the subsequent gap packet.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
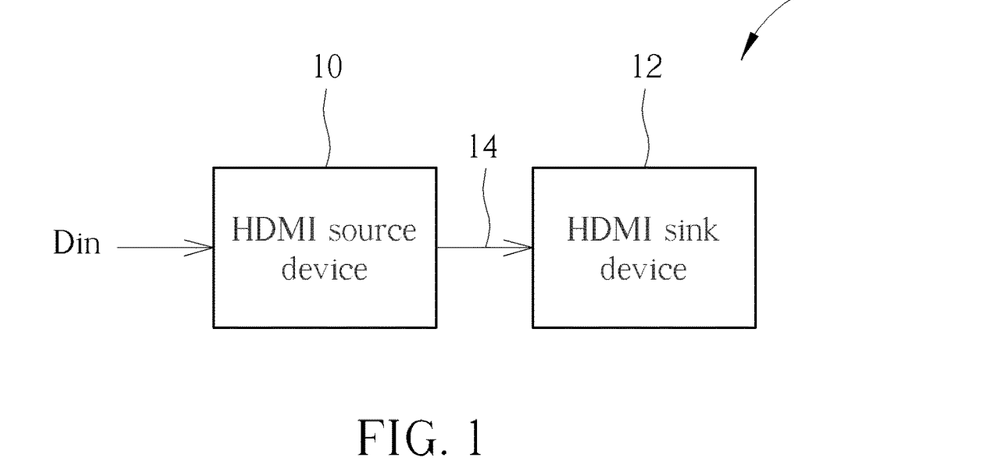
FIG. 1 is a block diagram of a high definition multimedia interface (HDMI) system according to an embodiment of the invention.

FIG. 1 is a block diagram of a high definition multimedia interface (HDMI) system 1 according to an embodiment of the invention. The HDMI system 1 includes an HDMI source device 10 and an HDMI sink device 12 compliant with the HDMI 2.1 specification. The HDMI system 1 may transfer data in a transition minimized differential signaling (TMDS) mode or a fixed rate link (FRL) mode. In the FRL mode, the HDMI source device 10 and the HDMI sink device 12 may first establish an FRL channel 14 therebetween according to the FRL protocol, and then the HDMI source device 10 may transmit FRL packets at a fixed data rate to the HDMI sink device 12 via the FRL channel 14.

The FRL channel 14 may be a three-lane channel or a four-lane channel. An FRL packet may be one of an active video packet, a video blanking packet, and a gap packet. Each FRL packet contains FRL characters having a fixed data length. The active video packet may also be referred to as a video packet including video data Din. The image blanking packet contains control data such as preamble, audio data, HSYNC data, and VSYNC data. The gap packet contains an FRL mapping character (for example, a 16-bit character with the first 6 bits representing a Gap type, and the remaining 10 bits preset as a value "1") without other FRL characters following thereafter.

The HDMI source device 10 may receive the video data Din from a server, a network streaming platform, an optical disc, or other video sources, and convert the video data Din into FRL packets. The HDMI source device 10 may transmit FRL packets in the unit of super blocks (SB). Each super block may contain 4 character blocks (CB), and each character block may contain 510 FRL characters. The video data Din may include digital video data, and may be in a digital image format such as the HDMI format, the DisplayPort format or the DVI format. The HDMI source device 10 may be a digital video set top box, an optical disc player, an HDMI repeater, an HDMI protocol converter or other HDMI transmission devices. When the HDMI source device 10 is an HDMI protocol converter, the HDMI source device 10 may receive data in a digital image format different from the HDMI format, and convert the data from the digital image formats into data compliant with the FRL protocol. The HDMI sink device 12 may receive FRL packets, generate video data Din according to the FRL packets, and play the video data Din. The HDMI sink device 12 may be a display, a projector, a digital TV or other HDMI receiver devices.

Figure 2:
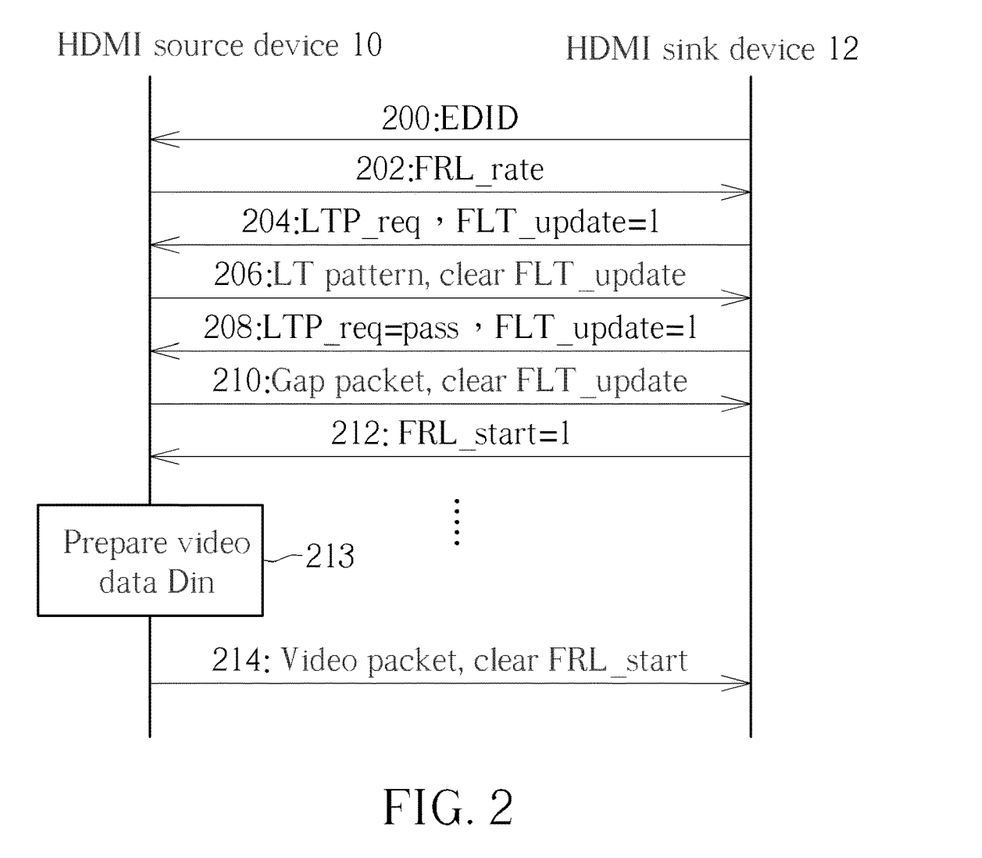
FIG. 2 is a message sequence chart of the HDMI system in FIG. 1.

During an FRL training cycle, the HDMI source device 10 and the HDMI sink device 12 may perform an FRL training process to determine the data transfer rate. FIG. 2 is a message sequence diagram of the FRL training process of the HDMI system 1 in an embodiment. The FRL training process includes Steps 200-214. Steps 200-208 are used in a data rate negotiation. Step 210 is used to start transmitting a start character of the super block. Steps 212-214 are used to transmit the video packets. Steps of the FRL training process may be briefly explained as follows (please refer to the HDMI 2.1 specification for the detailed process and definitions):

Step 200: The HDMI source device 10 reads extended display identification data (EDID) from the HDMI sink device 12;

Step 202: The HDMI source device 10 transmits a data rate parameter FRL rate to the HDMI sink device 12;

Step 204: The HDMI sink device 12 sets the link training pattern request LTP_req and sets the FLT update flag (ie, FLT_update=1) for the HDMI source device 10 to read;

Step 206: The HDMI source device 10 transmits the requested link training pattern and a command for clearing the FLT update flag FLT_update to the HDMI sink device 12;

Step 208: If the link training pattern is correct, the HDMI sink device 12 transmits the training pattern request LTP_req=pass and the FLT update flag FLT_update=1 to the HDMI source device 10;

Step 210: The HDMI source device 10 transmits a gap packet and a command for clearing the FLT update flag FLT_update to the HDMI sink device 12;

Step 212: The HDMI sink device 12 transmits the transmission start parameter FRL_start=1 to the HDMI source device 10;

Step 213: The HDMI source device 10 prepares video data Din;

Step 214: The HDMI source device 10 transmits video packets and a command for clearing the transmission start parameter FRL_start to the HDMI sink device 12.

The extended display identification data EDID includes information of the data rate supported by the HDMI sink device 12. In Step 202, the HDMI source device 10 selects one of the data rates supported by the HDMI sink device 12 as the selected data rate, and transmits the selected data rate in the data rate parameter FRL rate. In some embodiments, the HDMI source device 10 may select the highest data rate from all the data rates supported by the HDMI sink device 12 as the selected data rate. In Step 204, upon receiving the selected data rate, the HDMI sink device 12 selects a specific LT training pattern, and includes a request for the specific link training pattern in the link training pattern request LTP_req. In Step 206, the HDMI source device 10 transmits a specific link training pattern according to the training pattern requests LTP_req. In Step 208, upon receiving the specific link training pattern, if the link training pattern is correct, the HDMI sink device 12 responds to the HDMI source device 10 that the training pattern request LTP_req has passed; if the link training pattern is incorrect, the HDMI sink device 12 responds to the HDMI source device 10 that the training pattern request LTP_req has failed, and the FRL training process returns to Step 202. The HDMI source device 10 re-selects one of the data rates supported by the HDMI sink device 12 as the selected data rate, and Steps 202-208 are repeated until a correct link training pattern is received. In some embodiments, the HDMI source device 10 may select the second highest data rate from all the data rates supported by the HDMI sink device 12 as the selected data rate. In Step 210, the HDMI source device 10 transmits the start character of the super block, including a start super block (SSB) character and a gap packet. In Step 212, upon receiving the SSB character, the HDMI sink device 12 transmits the transmission start parameter FRL_start=1 to notify the HDMI source device 10 to start video packet transmission. In Step 214, after the video data Din is ready, the HDMI source device 10 transmits the video packet according to the selected data rate.

Figure 3:
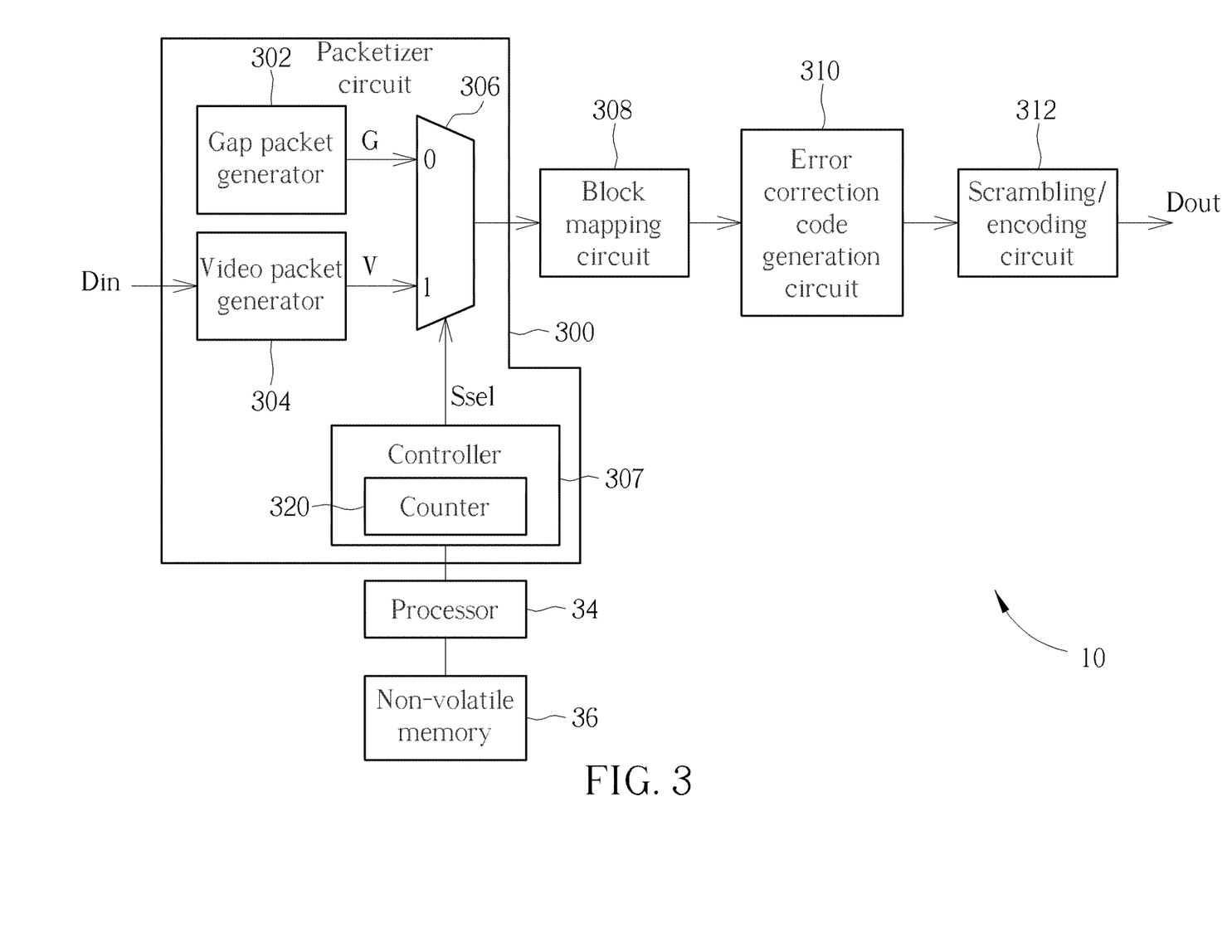
FIG. 3 is a block diagram of the HDMI source device in FIG. 1.

FIG. 3 is a block diagram of the HDMI source device 10. After the FRL training process is completed, if the video packets are temporarily failed to be generated owing to a format change of the video data Din or an abnormal signal unrelated to hot-plugging mechanism (i.e., a temporary stop of video packet generation caused by the hot-plugging actions/responses can be an exclusion), the HDMI source device 10 need not to perform the FRL training process again, and may continue to transmit gap packets in order to maintain the connection to the HDMI sink device 12. Subsequently, when the new video packet is ready, the HDMI source device 10 may seamlessly switch from transmitting the packet gaps to transmitting the video packets. Since the time required to complete the FRL training process may be of the order of hundreds of milliseconds to seconds, such training time may be noticeable to the users. In contrast, maintaining the connection between the HDMI source device 10 and the HDMI sink device 12 and switching to transmit the video packets upon readiness of the video data Din without re-performing the FRL training process may effectively shorten a video switching time, achieving a quicker video transmission and enhancing user experience.

The HDMI source device 10 may include, but is not limited to, a packetizer circuit 300, a processor 34, a non-volatile memory 36, a block mapping circuit 308, an error correction code generation circuit 310, and a scrambling/encoding circuit 312. The packetizer circuit 300 may be coupled to the processor 34 and the block mapping circuit 308. The processor 34 may be coupled to the non-volatile memory 36. The block mapping circuit 308, the error correction code generation circuit 310 and the scrambling/encoding circuit 312 may be coupled in sequence.

The packetizer circuit 300, the block mapping circuit 308, the error correction code generation circuit 310, and the scrambling/encoding circuit 312 may sequentially encode the video data Din to generate the output data Dout, and the output data Dout is transmitted to the HDMI sink device 12 via the FRL channel 14. The packetizer circuit 300 may include a gap packet generator 302, a video packet generator 304, a multiplexer 306 and a controller 307. The multiplexer 306 may include a first input terminal (labeled as "0" at the multiplexer 306 in FIG. 3) coupled to the gap packet generator 302; a second input terminal (labeled as "1" at the multiplexer 306 in FIG. 3) coupled to the video packet generator 304; a selection terminal coupled to the controller 307; and an output terminal coupled to the block mapping circuit 308.

Figure 6:
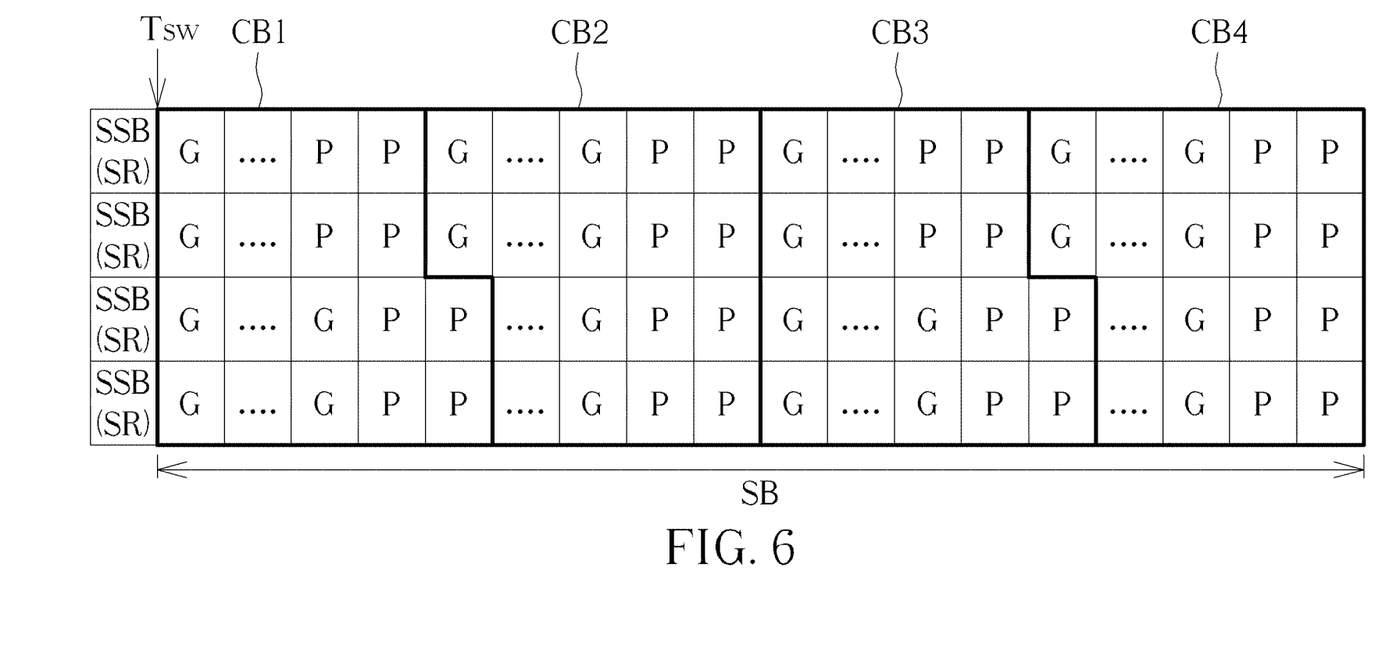
FIG. 6 is a detail schematic diagram of packet switching method implemented by the control method in FIG. 4.
Figure 7:
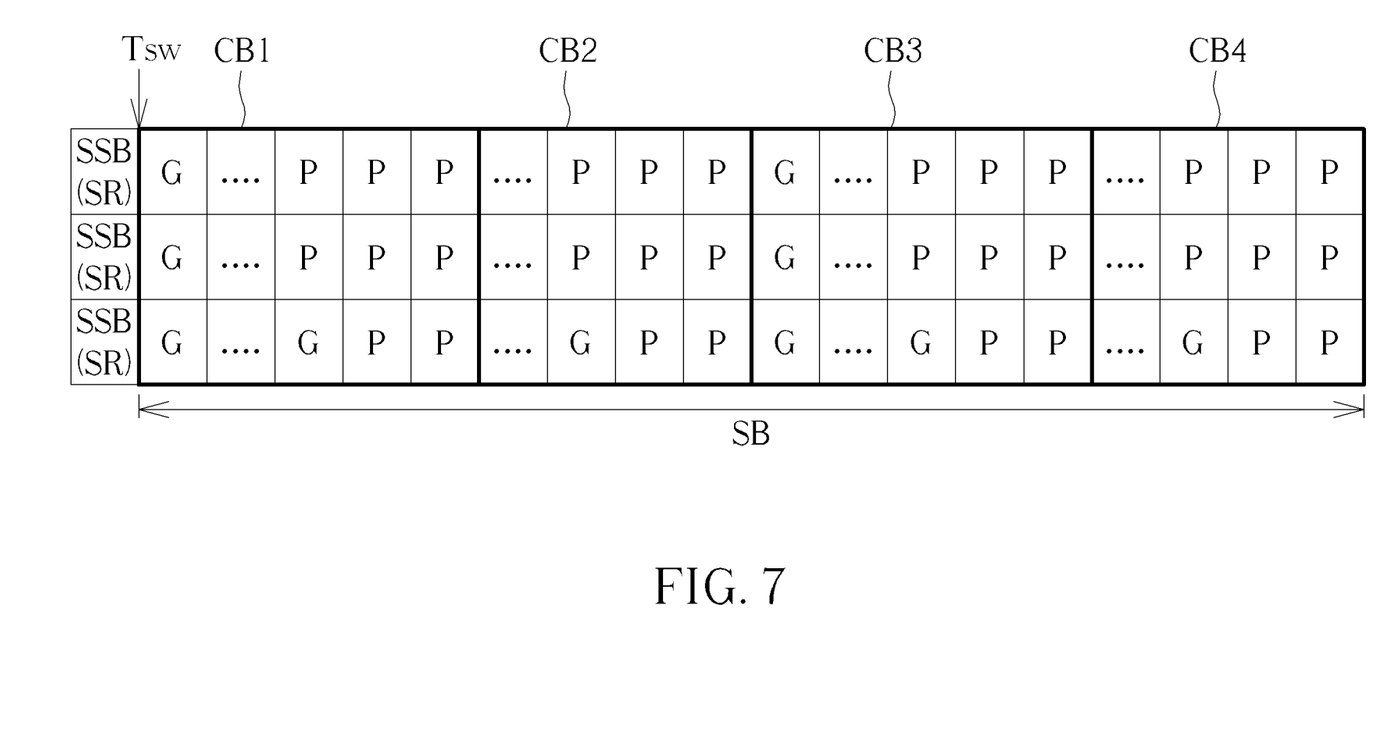
FIG. 7 is a detail schematic diagram of another packet switching method implemented by the control method in FIG. 4.

The gap packet generator 302 may generate a gap packet G, the video packet generator 304 may generate a video packet V according to the video data Din, and the selection terminal of the multiplexer 306 may receive a selection signal Ssel from the controller 307 to output at the output terminal of the multiplexer 306 the data at one of the first input terminal and the second input terminal according to the selection signal Ssel. When the selection signal Ssel selects the first input terminal, the output terminal of the multiplexer 306 may output the gap packet G; and when the selection signal Ssel selects the second input terminal, the output terminal of the multiplexer 306 may output the video packet V. The block mapping circuit 308 may identify the character block and the super block according to the number of FRL packets output from the packetizer circuit 300. For example, each character block contains 510 FRL characters including 502 FRL packets and 8 correction characters. Each super block contains 2040 FRL characters, or 4 character blocks. The block mapping circuit 308 may insert a start super block character or a scrambler reset (SR) character at the beginning of each lane of the super block for the 3-lane or 4-lane FRL mode to align data received by the HDMI sink device 12. After 32 super blocks preceded by starting super block characters, a scrambler reset character preceding a super block may be transmitted to indicate that the scrambler is reset. FIGS. 6 and 7 respectively show the super block SB for the 4-lane FRL mode and the 3-lane FRL mode. For the super block SB in the 4-lane FRL mode, the block mapping circuit 308 may insert a start super block character SSB or a scramble reset character SR at the beginning of each lane of the super block SB to be transmitted; for the super block SB in the 3-lane FRL mode, the block mapping circuit 308 may insert 1 start super block character SSB or 1 scrambler reset character SR at the beginning of each lane of the super block SB to be transmitted. The error correction code generation circuit 310 may insert 8 forward error correction (FEC) characters at the end of the character block. The forward error correction characters may be Reed-Solomon (Reed-Solomon, RS) FEC correction characters. The scrambling/encoding circuit 312 may scramble and encode the character block succeeded by correction characters to generate the output data Dout. The scrambling process may reduce the electric magnetic interference (EMI) of the output data Dout, and the encoding (e.g., 16b/18b encoding) may provide DC balance characteristics to the output data Dout, reducing inter-symbol interference at the HDMI sink device 12.

The non-volatile memory 36 may store executable code. The executable code is firmware of the HDMI source device 10. The processor 34 may load and execute the executable code from the non-volatile memory 36 to control the operations of the HDMI source device 10. The controller 307 may receive commands from the processor 34 to control the operation of the packetizer circuit 300. In some embodiments, the controller 307 may output the selection signal Ssel upon receiving a gap packet generation command for the packetizer circuit 300 to output the gap packet G, and switch the selection signal Ssel upon receiving a video packet generation command for the packetizer circuit 300 to output the video packet V. The non-volatile memory 36 may be a NAND flash memory, a NOR flash memory, an electronically erasable programmable read-only memory (EEPROM) or other types of non-volatile memories. The processor 34 may be a central processing unit, a microprocessor, a digital signal processor or other processing units.

Figure 4:
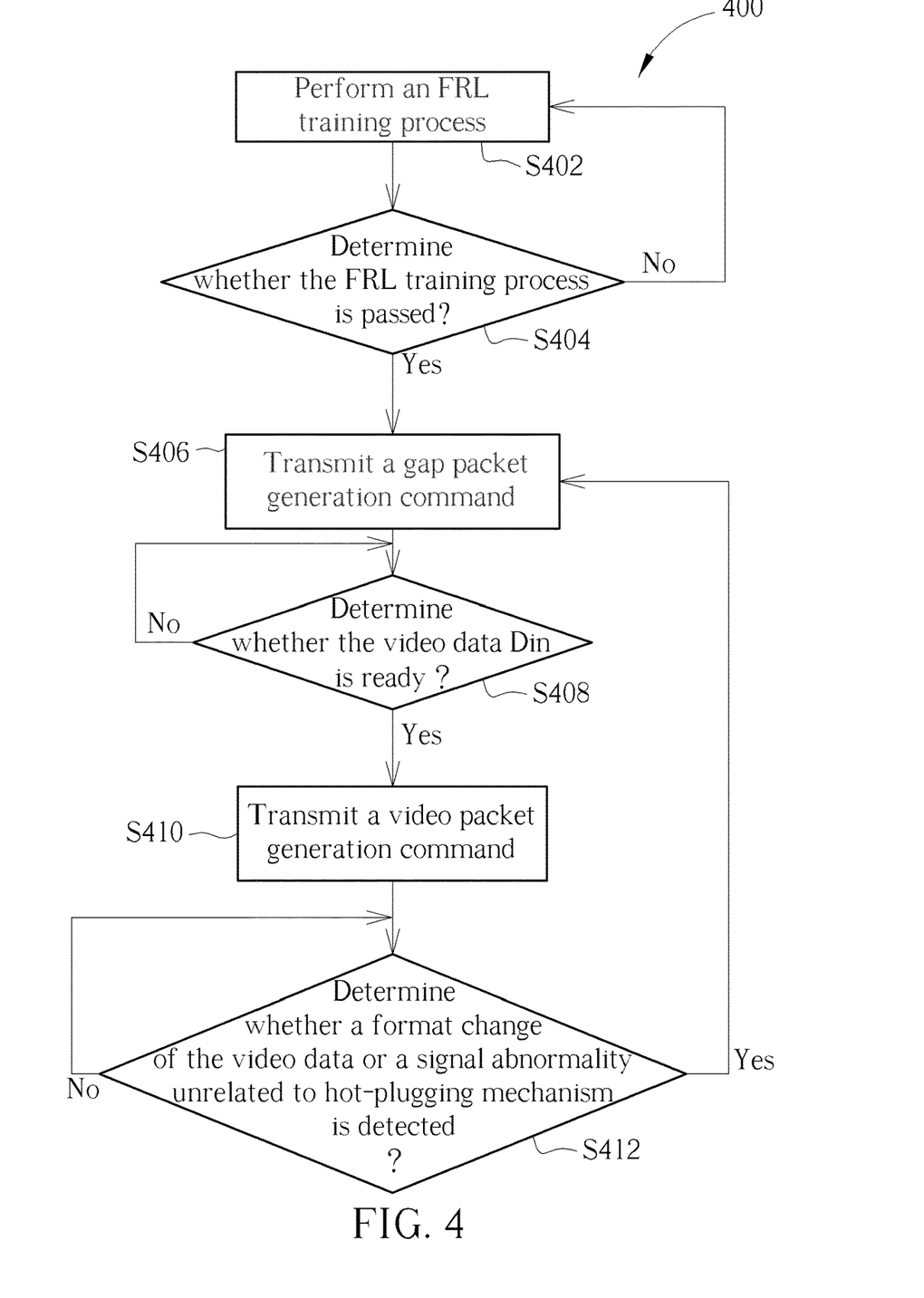
FIG. 4 is a flowchart of a controlling method applicable to the HDMI source device in FIG. 1.

FIG. 4 is a flowchart of a method 400 of controlling the HDMI source device 10. The control method 400 may be implemented by the processor 34 and the executable code, and may include Steps S402-S412. Steps S402-S404 are used to perform the FRL training process to determine the transmission data rate. Steps S406-S412 are used to maintain the FRL channel upon detecting a format change or a signal abnormality unrelated to hot-plugging. Any reasonable Step change or adjustment is within the scope of the disclosure. Steps S402-S412 are detailed as follows:

Step S402: Perform an FRL training process;
Step S404: Determine whether the FRL training process is passed? If so, go to Step S406; if not, go to Step S402;
Step S406: Transmit a gap packet generation command;
Step S408: Determine whether the video data Din is ready? If so, go to Step S410; if not, repeat Step S408;
Step S410: Transmit a video packet generation command; and go to S412;
Step S412: Determine whether a format change of the video data or a signal abnormality unrelated to hot-plugging mechanism is detected? If so, go to Step S406; if not, repeat Step S412;

In Step S408, when at least one frame of video data Din is continuously and steadily received, the processor 34 determines that the video data Din is ready, and then transmits the video packet generation command to the controller 307 (Step S410). In response to the video packet generation command, the controller 307 controls the packetizer circuit 300 to generate a video packet V. When the processor 34 fails to continuously and steadily receive at least one frame of the video data Din, the processor 34 may determine that the video data Din is not ready. In Step S412, the processor 34 determines whether a format change of the video data Din or a signal abnormality unrelated to hot-plugging mechanism is detected according to a control signal and/or a front-end signal. In some embodiments, the control signal may carry information of the format change. Upon receiving the control signal, the processor 34 determines that the format change of the video data Din has occurred. In some embodiments, the front-end signal may be an error detection signal generated by an error detection circuit (not shown). When the error detection circuit detects that the video data Din contains an error, the error detection circuit may notify the processor 34 with an error detection signal. In other embodiments, when the front-end circuit detects that the signal of the video data Din is unstable or interrupted temporarily, the front-end signal may be generated to notify the processor 34 of the signal abnormality. In other embodiments, when the front-end circuit detects that the FRL channel 14 is disconnected owing to hot plugging, the front-end signal may be used to notify the processor 34 of a signal abnormality, so that the processor 34 re-executes the FRL training process (i.e., start all over from Step S402). Upon detecting a format change of the video data Din or a signal abnormality unrelated to hot plugging, the processor 34 may switch to transmitting a gap packet generation command for the packetizer circuit 300 to generate gap packets G, so as to maintain the connection to the HDMI sink device 12. When the video data Din is re-stabilized or a new image format data is received, the processor 34 may generate the video packet generation command to switch back to outputting video packets V, reducing the time for the HDMI sink device 12 to display the image, and achieving quick image recovery. When the processor 34 determines that the HDMI system 1 respond a signal abnormality due to hot plugging, the processor 34 may redo the FRL training process (Step S402) in order to comply with the HDMI 2.1 specification.

In Step S404, if the FRL training process of the HDMI system 1 is passed, the processor 34 may transmit an initial gap packet generation command to the controller 307 (Step S406). In Step S412, if a format change of the video data Din or a signal abnormality unrelated to the hot plugging mechanism is detected, the processor 34 may transmit a subsequent gap packet generation command to the controller 307 (Step S406). The initial gap packet generation command and the subsequent gap packet generation command are generated in different conditions, but both may be of the same type of gap packet generation commands. In response to the initial gap packet generation command, the controller 307 enables the packetizer circuit 300 to generate an initial gap packet G; and, in response to the subsequent gap packet generation command, the controller 307 enables the packetizer circuit 300 to generate a subsequent gap packet G. The initial gap packet G and the subsequent gap packet G are both gap packets G. The difference between the two is that the initial gap packet G is transmitted after passing the FRL training process and may be transmitted at any suitable time, while the subsequent gap packet G is used during a temporary interruption of the video data Din, and therefore, the transmission of the subsequent gap packet G basically complies with the timing of the super block specified in the FRL protocol. The controller 307 may determine whether the video packet V is transmitted upon receiving the initial gap packet generation command or the subsequent gap packet generation command. If the video packet V has not been transmitted, the controller 307 may output the selection signal Ssel to output the initial gap packet G. If the video packet V has been transmitted, the controller 307 may determine whether the first block boundary is reached, and generate the selection signal Ssel to switch from outputting the video packet V to outputting the subsequent gap packet P upon reaching the first block boundary.

The position of the first block boundary may be determined according to a predetermined period. Referring to FIG. 3, the controller 307 may include a counter 320, and the counter 320 may measure the predetermined period according to a clock. Upon reaching the predetermined period, the controller 307 may determine that the first block boundary is reached. The predetermined period may be determined according the number of FRL channels. In some embodiments, the first block boundary may be the starting boundary of a super block. When HDMI system 1 adopts the 3-lane FRL mode, the predetermined period may be 680 FRL characters for a single-lane channel; when HDMI system 1 adopts the 4-lane FRL mode, the predetermined period may be 510 FRL characters for the single-lane channel. In other embodiments, the first block boundary may be the starting boundary of a character block. When HDMI system 1 adopts the 3-lane FRL channels, the predetermined period may be 170 FRL characters for a single-lane channel; when HDMI system 1 adopts the 4-lane FRL channels, the predetermined period may be 255 FRL characters for a single-lane channel.

Similarly, when the video data Din is re-stabilized or a new format of video data is received, the subsequent video packet V basically complies with the timing of the super block specified in the FRL protocol. The video packet generator 304 may generate a subsequent video packet V according to the subsequent video data Din. The controller 307 may determine whether a second block boundary is reached upon receiving a video packet generation command, and generate the selection signal Ssel to switch from outputting the subsequent gap packets to outputting the subsequent video packets upon reaching the second block boundary. The position of the second block boundary may also be determined according to a predetermined period. The second block boundary may be the starting boundary of a super block or the starting boundary of a character block.

Figure 5:
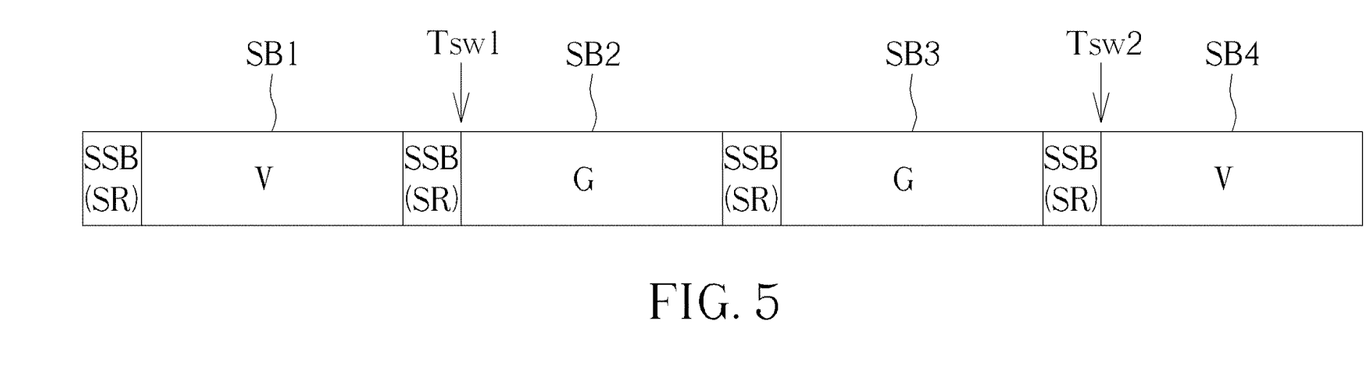
FIG. 5 is a schematic diagram of super block-based packet switching implemented by the control method in FIG. 4.

FIG. 5 is a schematic diagram of super block-based packet switching implemented by the control method 400. FIG. 5 contains super blocks SB1-SB4. Each super block is preceded by a start super block character SSB or a scrambler reset character SR to indicate the beginning of each super block; each super block contains video packets V or gap packets G. Before a switching time Tsw1, the video data Din is supplied properly, and the super block SB1 contains the video packets V. Between the switching time Tsw1 and a switching time Tsw2, the video data Din is temporarily interrupted owing to a format change or a disconnection resulting from signal instability unrelated to the hot plugging mechanism, and as a consequence, the super blocks SB2 and SB3 contain the gap packets G but not the video packets V. After the switching time Tsw2, the supply of the video data Din resumes, and the super block SB4 contains the video packets V. While not shown in the embodiment in FIG. 5, the super blocks SB1 and SB4 may also contain gap packets G, image blanking packets VB (as shown in FIG. 8), and RS FEC correction characters P (as shown in FIG. 7); the super blocks SB2, SB3 may also contain RS FEC correction characters P.

FIG. 6 is a schematic diagram of a super block-based packet switching method implemented by the control method 400, and is applicable in the 4-lane FRL mode. FIG. 7 is a schematic diagram of another super block-based packet switching method implemented by the control method 400, and is applicable in the 3-lane FRL mode. FIGS. 6 and 7 include super blocks SB. Each super block SB includes character blocks CB1-CB4, and each character block includes gap packets G and RS FEC correction characters P. After a switching time Tsw, the video data Din is temporarily interrupted. Each character block only contains the gap packets G and the RS FEC correction character P.

Figure 8:
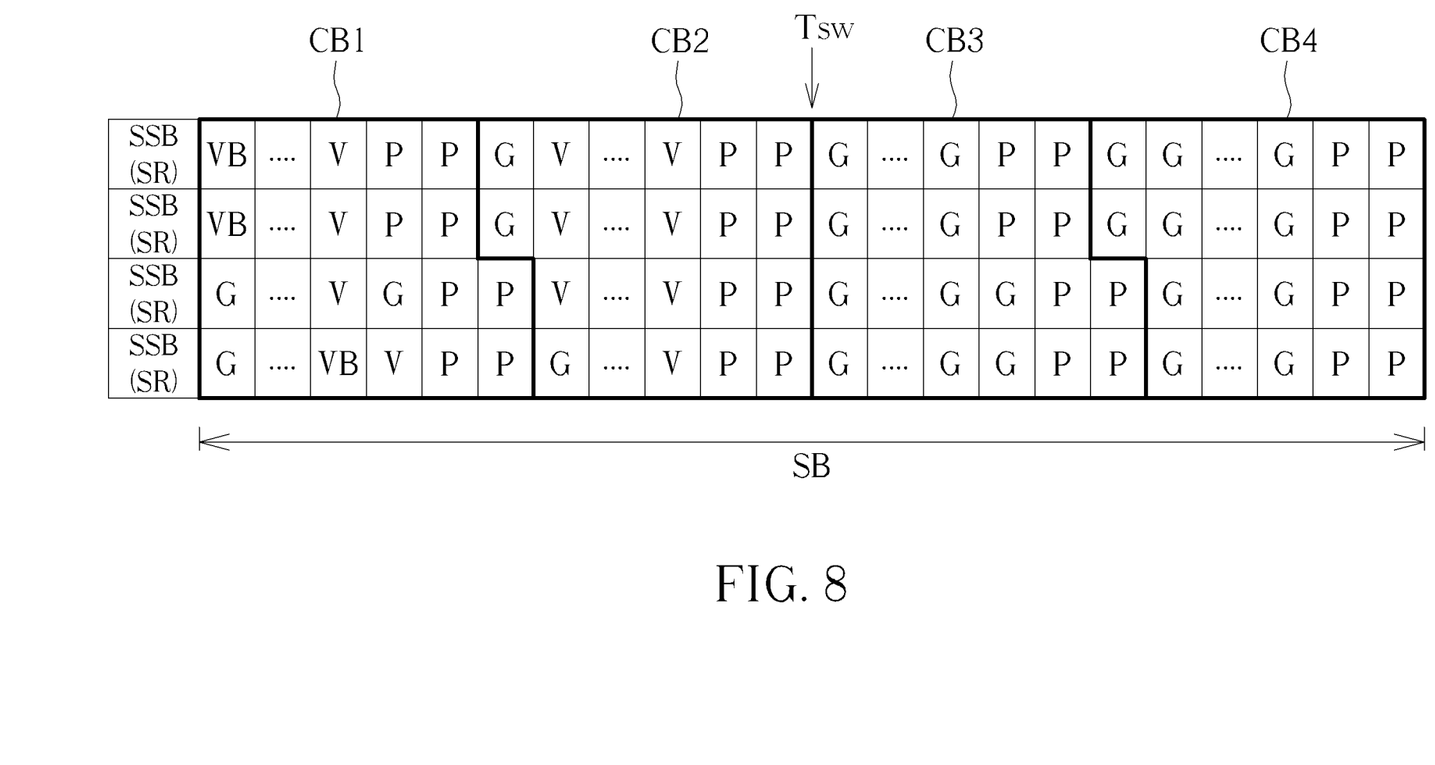
FIG. 8 is a detail schematic diagram of another packet switching method implemented by the control method in FIG. 4.
Figure 9:
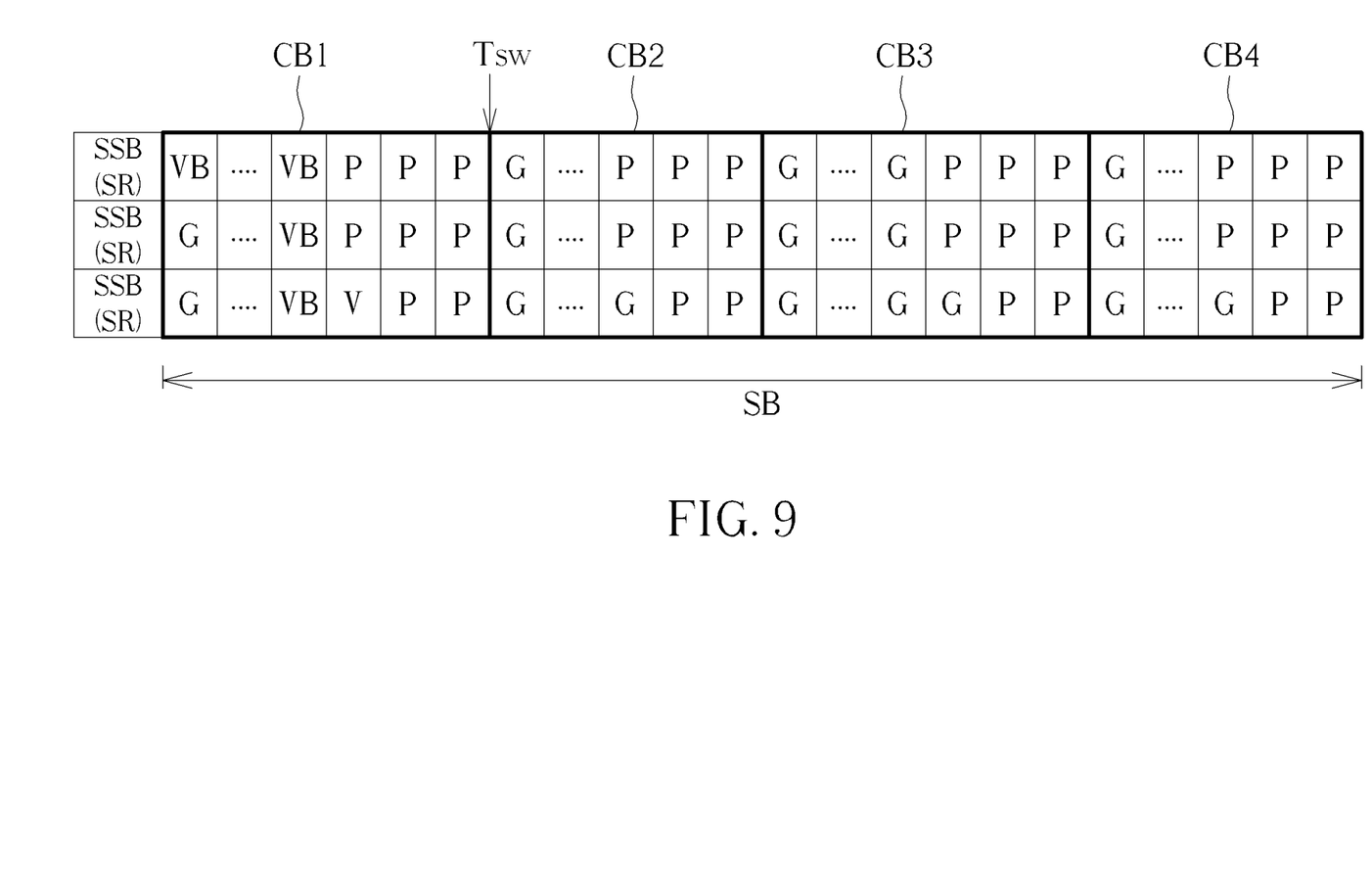
FIG. 9 is a detail schematic diagram of another packet switching method implemented by the control method in FIG. 4.

FIG. 8 is a detailed schematic diagram of a character block-based packet switching method implemented by the control method 400, and is applicable in the 4-lane FRL mode. FIG. 9 is a detailed schematic diagram of another character block-based packet switching method implemented by the control method 400, and is applicable in the 3-lane FRL mode. FIGS. 8 and 9 include super blocks SB, and each super block SB includes character blocks CB1-CB4. Before a switching time Tsw, the video data Din is supplied properly, and each character block may contain the image blanking packets VB, the video packets V, the gap packets G, and the RS FEC correction characters P. After the switching time Tsw, the video data Din is temporarily interrupted. Each character block only contains the gap packets G and the RS FEC correction character P. Since in the 4-lane FRL mode (as shown in FIG. 8), the starting boundaries of the character blocks CB1 and CB3 are aligned boundaries and the starting boundaries of the character blocks CB2 and CB4 are misaligned boundaries, the switching time Tsw may only occur at the starting boundaries of character blocks CB1 and CB3.

Figure 10:
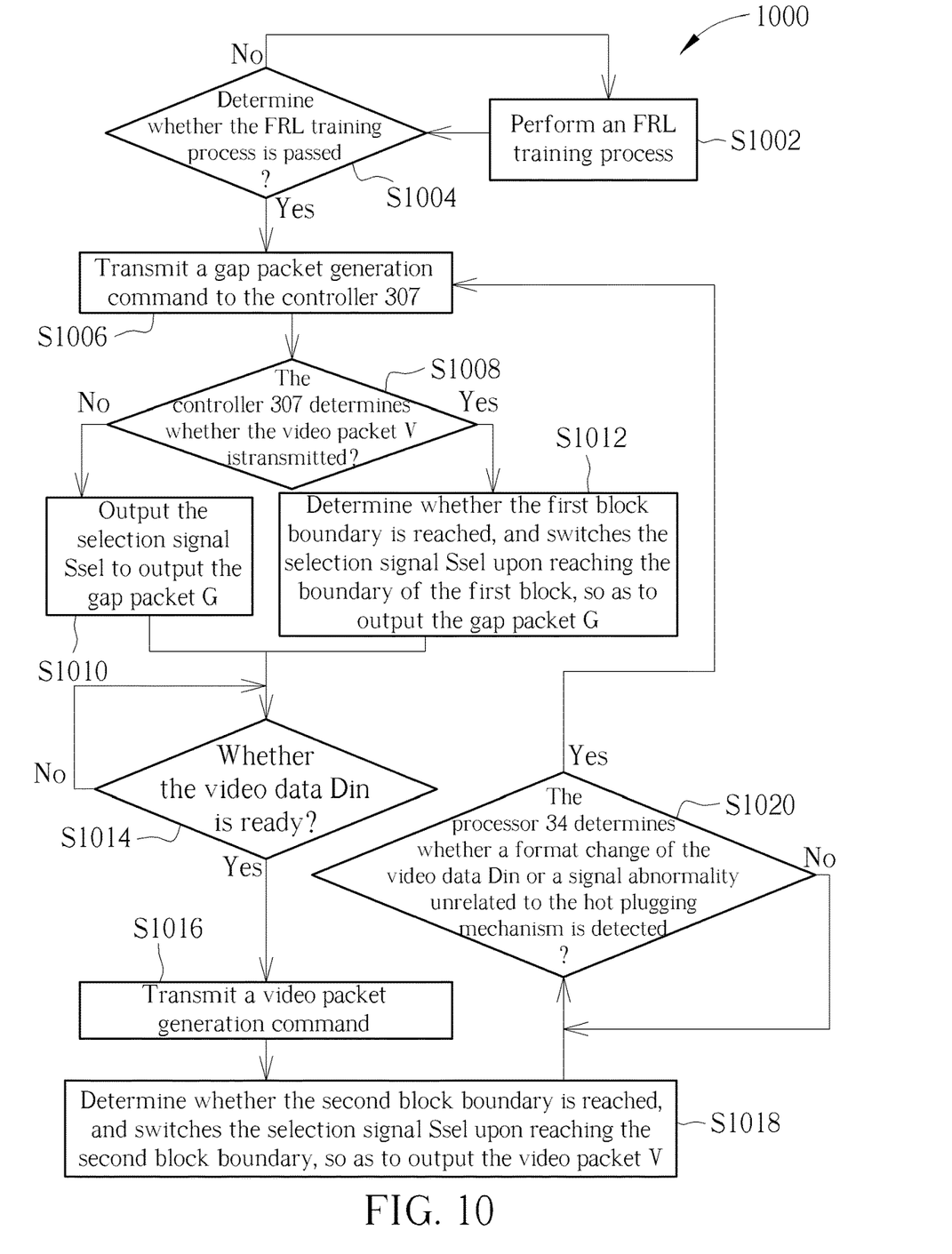
FIG. 10 is a flowchart of another controlling method applicable to the HDMI source device in FIG. 1.

FIG. 10 is a flowchart of a method 1000 of controlling the HDMI source device 10. The control method 1000 may be implemented by the executable code, the controller 307 and the processor 34, and may include Steps S1002-S1020. Steps S1002 and S1004 are used to perform FRL training process to determine the transmission data rate. Steps S1006, S1014, and S1020 are used to switch to generating gap packets G without redoing the FRL training process when the video data Din is temporarily suspended and is unrelated to the hot-plugging mechanism. Steps S1008-S1012 are used to determine whether to generate an initial gap packet G or a subsequent gap packet G. Steps S1016 and S1018 are used to generate the video packet V. Any reasonable step change or adjustment is within the scope of the disclosure. Steps S1002-S1020 are detailed as follows:

Step S1002: Perform an FRL training process;

Step S1004: Determine whether the FRL training process is passed? If so, go to Step S1006; if not, go to Step S1002;

Step S1006: The processor 34 transmits a gap packet generation command to the controller 307;

Step S1008: The controller 307 determines whether the video packet V is transmitted? If so, go to Step S1012; if not, go to Step S1010;

Step S1010: The controller 307 outputs the selection signal Ssel for the packetizer circuit 300 to output the gap packet G; go to Step S1014;

Step S1012: The controller 307 determines whether the first block boundary is reached, and switches the selection signal Ssel upon reaching the boundary of the first block, for the packetizer circuit 300 to output the gap packet G;

Step S1014: The processor 34 determines whether the video data Din is ready? If so, go to Step S1016; if not, repeat Step S1014;

Step S1016: The processor 34 transmits a video packet generation command to the controller 307;

Step S1018: The controller 307 determines whether the second block boundary is reached, and switches the selection signal Ssel upon reaching the second block boundary, for the packetizer circuit 300 to output the video packet V;

Step S1020: The processor 34 determines whether a format change of the video data Din or a signal abnormality unrelated to the hot plugging mechanism is detected? If so, go to Step S1006; if not, repeat Step S1020;

the HDMI source device 10 and the control method 400, 1000 will not redo FRL training in response to a video interruption unrelated to the hot-plugging mechanism or a format change, but will switch to the output gap packet G to maintain the connection to the HDMI sink device 12, and will switch back to outputting video packet once the video data Din is re-stabilized or video data in the new format is received. Therefore, the HDMI source device 10 and the control method 400, 1000 may shorten the time for the HDMI sink device 12 to replay, achieving the effect of accelerating image recovery, and achieving faster image transmission and enhancing user experience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A high definition multimedia interface (HDMI) transmission device comprising:
　a packetizer circuit comprising:
　　a gap packet generator configured to generate an initial gap packet and a subsequent gap packet;
　　a video packet generator configured to generate a video packet according to video data;
　　a multiplexer comprising a first input terminal coupled to the gap packet generator, a second input terminal coupled to the video packet generator, a selection terminal configured to receive a selection signal, and an output terminal configured to output data from one of the first input terminal and the second input terminal according to the selection signal; and
　　a controller coupled to the multiplexer and configured to output the selection signal to output the initial gap packet upon receiving an initial gap packet generation command, determine whether a first block boundary is reached upon receiving a subsequent gap packet generation command, and switch the selection signal upon reaching the first block boundary, so as to switch from outputting the video packet to outputting the subsequent gap packet;
　a non-volatile memory configured to store executable code; and
　a processor coupled to the controller and the non-volatile memory, and configured to execute the executable code to:
　　perform a fixed rate link (FRL) training process;
　　upon passing the fixed rate link training process, transmit the initial gap packet generation command to the controller;
　　when the video data is not ready, continue to output the initial gap packet; and when the video data is ready and a format change of the video data is detected and/or a signal abnormality unrelated to a hot-plugging mechanism is detected, transmit the subsequent gap packet generation command to the controller.

2. The HDMI transmission device of claim 1, wherein the controller is configured to determine whether the video packet is transmitted upon receiving the initial gap packet generation command or receiving the subsequent gap packet generation command.

3. The HDMI transmission device of claim 1, wherein:
the controller comprises a counter configured to measure a predetermined period according to a clock; and
when the predetermined period is reached, the controller determines that the first block boundary is reached.

4. The HDMI transmission device of claim 1, wherein the first block boundary is a start boundary of a super block.

5. The HDMI transmission device of claim 1, wherein the first block boundary is a start boundary of a character block.

6. The HDMI transmission device of claim 1, wherein:
the video packet generator is further configured to generate a subsequent video packet according to subsequent video data;
the controller is further configured to determine whether a second block boundary is reached upon receiving a video packet generation command, and switch the selection signal upon reaching the second block boundary, so as to switch from outputting the subsequent gap packet to outputting the subsequent video packet; and
the processor is further configured to execute the executable code to output the video packet generation command to the controller upon receiving the subsequent video data.

7. The HDMI transmission device of claim 1, further comprising:
a block mapping circuit is coupled to the packetizer circuit and configured to determine a character block and a super block according to data output by the packetizer circuit, and insert a start super block character or a scrambler reset character at a beginning of the super block;
an error correction code generation circuit coupled to the block mapping circuit and configured to insert correction characters at an end of the character block; and
a scrambling/encoding circuit coupled to the error correction code generation circuit and configured to scramble and encode the character block succeeded by the inserted correction characters to generate output data.

8. A method of controlling an HDMI transmission device, the HDMI transmission device comprising a packetizer circuit and a processor, the method comprising:
performing a fixed rate link training process;
upon passing the fixed rate link training process, the processor transmitting an initial gap packet generation command to a controller of the packetizer circuit;
upon receiving the initial gap packet generation command, the controller outputting a selection signal to the packetizer circuit for the packetizer circuit to generate an initial gap packet and output the initial gap packet;
when it is determined that video data is not ready, continuously outputting the initial gap packet;
when the video data is ready and a format change of the video data is detected or a signal abnormality unrelated to a hot-plugging mechanism is detected, the processor transmitting a subsequent gap packet generation command to the controller;

generating a video packet according to video data;
generating a subsequent gap packet; and
upon receiving the subsequent gap packet generation command, the controller determining whether a first block boundary is reached, and switching the selection signal upon reaching the first block boundary for the packetizer circuit to switch from outputting the video packet to outputting the subsequent gap packet, wherein the video packet is generated.

9. The method of claim 8, wherein:
upon receiving the initial gap packet generation command, the controller outputting the selection signal to the packetizer circuit for the packetizer circuit to output the initial gap packet comprises:
upon receiving the initial gap packet generation command, the controller determining whether the video packet is transmitted, and if not, outputting the selection signal to output the initial gap packet;
upon receiving the subsequent gap packet generation command, the controller determining whether the first block boundary is reached, and switching the selection signal upon reaching the first block boundary, for the packetizer circuit to switch from outputting the video packet to outputting the subsequent gap packet comprises:
upon receiving the subsequent gap packet generation command, the controller determining whether the video packet is transmitted, and upon transmitting the video packet, determining whether the first block boundary is reached, and switching the selection signal upon reaching the first block boundary for the packetizer circuit to switch from outputting the video packet to outputting the subsequent gap packet.

10. The method of claim 8, wherein the controller determining whether the first block boundary is reached comprises measuring a predetermined period according to a clock, and upon reaching the predetermined period, the controller determining that the first block boundary is reached.

11. The method of claim 8, wherein the first block boundary is a start boundary of a super block.

12. The method of claim 8, wherein the first block boundary is a start boundary of a character block.

13. The method of claim 8, wherein the packetizer circuit comprises a video packet generator, and the method further comprises:
the video packet generator generating a subsequent video packet according to subsequent video data;
the controller determining whether a second block boundary is reached upon receiving a video packet generation command, and switching the selection signal upon reaching the second block boundary, so as to switch from outputting the subsequent gap packet to outputting the subsequent video packet; and
the processor executing the executable code to output the video packet generation command to the controller upon receiving the subsequent video data.

14. The method of claim 8, wherein the HDMI transmission device further comprises a block mapping circuit, an error correction code generation circuit and a scrambling/encoding circuit, and the method comprises:
the block mapping circuit determining a character block and a super block according to data output by the packetizer circuit,
the block mapping circuit inserting a start super block character or a scrambler reset character at each lane of a beginning of the super block;

the error correction code generation circuit inserting correction characters at an end of the character block; and the scrambling/encoding circuit scrambling and encoding the character block succeeded by the inserted correction characters to generate output data.

\* \* \* \* \*